United States Patent [19]

Pierce et al.

[11] Patent Number: 4,999,161

[45] Date of Patent: Mar. 12, 1991

[54] MODIFIED POLYMERS INCORPORATING FATTY AMINES

[75] Inventors: Claudia C. Pierce, Naperville; David A. Grattan, LaGrange Highlands; Dodd W. Fong, Naperville, all of Ill.

[73] Assignee: Nalco Chemical Company, Naperville, Ill.

[21] Appl. No.: 297,272

[22] Filed: Jan. 13, 1989

Related U.S. Application Data

[62] Division of Ser. No. 904,434, Sep. 8, 1986, abandoned.

[51] Int. Cl.$^5$ .............................................. C23F 11/04
[52] U.S. Cl. ...................................... 422/12; 252/392; 422/13; 422/16
[58] Field of Search .................... 252/392; 422/12, 13, 422/16

[56] References Cited

U.S. PATENT DOCUMENTS 3,478,003 11/1969 McLendon .
3,503,946 3/1970 Scanley et al. .
4,744,949 5/1988 Hoots et al. ........................... 422/16
4,797,224 1/1989 Crucil et al. ........................... 422/16

Primary Examiner—Bernard Lipman
Attorney, Agent, or Firm—Anthony L. Cupoli; Donald G. Epple

[57] ABSTRACT

The invention is a method of making water-insoluble aliphatic primary or secondary amines, water-soluble or dispersible, which comprises reacting at a temperature of at least 120° C. these amines with water-soluble acrylamide polymer which contains at least 5 mole percent acrylamide to transamidate not more than 50% mole percent of the acrylamide polymer with the water-insoluble aliphatic primary or secondary amine. The invention also covers a water-soluble or dispersible polymeric composition comprising an acrylic acid polymer having a molecular weight within the range of 500–100,000 which contains between 0.5–50 mole percent of the acrylic acid groups in the form of the amides of a water-insoluble aliphatic primary or secondary amine which contains from 10–36 carbon atoms.

4 Claims, No Drawings

MODIFIED POLYMERS INCORPORATING FATTY AMINES

This application is a division of application Ser. No. 904,434, filed Sept. 8, 1986 now abandoned.

INTRODUCTION

Long chain aliphatic amines (filming amines) are commonly used to protect condensate systems against $CO_2$ and $O_2$ corrosion. Since their solubility in water is very low, the use of emulsifiers and surfactants is needed to make stable water-based products.

The advantage of this invention is to transform water insoluble filming amines into easy-to-handle, water-soluble/water-dispersible products, by bonding the amines to water-soluble polyelectrolytes. Whenever hydrolysis conditions occur, such as high temperatures and/or high/low pH's, the filming amines are released into solution to protect the environment against corrosion.

Fields of applications include all those areas in which filming amines are already in use, e.g. boilers for condensate corrosion protection, downhole corrosion prevention for tertiary oil recovery, corrosion inhibitors for refinery overhead systems, etc., providing that conditions are such for hydrolysis of the amines bonded to the polymer to occur. In addition, the polyelectrolyte portion provides hardness and iron control properties.

THE INVENTION

A method of making water-insoluble aliphatic primary or secondary amines, water-soluble or dispersible, which comprises reacting at a temperature of at least 120° C. these amines with water-soluble acrylamide polymers which contain at least 5 mole percent acrylamide to transamidate not more than 50 mole percent of the acrylamide polymer with the water-insoluble aliphatic primary or secondary amine.

The invention also comprises a water-soluble or dispersible polymeric composition comprising an acrylamide polymer having a molecular weight within the range of 500–100,000 which contains between 0.5–50 mole percent of the acrylic acid groups in the form of the amides of a water-insoluble aliphatic primary or secondary amine which contains from 10–32 carbon atoms. These polymeric compositions are further characterized as being capable of releasing the amine portion thereof under conditions of hydrolysis with high temperatures and low or high pH's.

The invention is also directed to using the modified polymers described for preventing condensate corrosion.

The Water-Insoluble Aliphatic Primary or Secondary Amines

The aliphatic amines used in preparing inhibitors are those amines having the general structural formula

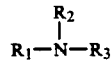

where $R_1$ is an aliphatic hydrocarbon radical of 8 to 22 carbon atoms in chain length and both $R_2$ and $R_3$ are selected from the group consisting of hydrogen and an aliphatic hydrocarbon radical of 1 to 22 carbon atoms in chain length. The total carbon atoms in $R_1$, $R_2$ and $R_3$ should be within the range of 10–36 carbon atoms with at least one occurrence of $R_2$ or $R_3$ as hydrogen.

The above structural formula includes both primary and secondary aliphatic monoamines. Illustrative compounds coming within the above general formula include such primary amines as n-dodecyl amine, n-tetradecyl amine, n-hexadecylamine, octadecylamine, and oleyl amine. Other commercially available primary amines include coconut oil amine, tallow amine, hydrogenated tallow amine and cottonseed oil amine. Useful secondary amines are dilauryl amine, dimyristyl amine, dipalmityl amines, distearyl amine, dicoconut amine and dihydrogenated tallow amine.

In the case of many of the above amines, it will be noted that the source of alkyl substituent on the organic nitrogen is derived from a mixed vegetable oil or animal fat. For purposes of convenience, these compounds have been named from the derivative alkyl-containing components. This system of nomenclature, particularly in the case of alkyl substituents derived from naturally occurring products such as fats, oils and the like, is used for purposes of simplification. It is believed that those familiar with the art will readily understand that the alkyl substituent varies in the case of a coconut substituent with the alkyl groups containing from 8 to 18 carbon atoms in chain length. Similarly, in the case of hydrogenated tallow, the alkyl substituent will vary from about 12 to 20 carbon atoms in chain length.

Preferred aliphatic primary monoamines are amines having the general structural formula $$R-NH_2$$

wherein R is an aliphatic hydrocarbon radical of from 10 to 36 carbon atoms in chain length. A preferred material of this type is the commercial product "Armeen SD" sold by the Armour Industrial Chemical Company which is known generically to the art as Soya amine. As applied to the above formula the R group is a mixed aliphatic radical which has the following components:

|  | Percent |
|---|---|
| Hexadecyl | 10 |
| Octadecyl | 10 |
| Octadecenyl | 35 |
| Octadecadienyl | 45 |

For purposes of the invention, the fatty substituted diamines described in U.S. Pat. No. 3,029,125 are capable of use.

The Water-Soluble Acrylamide Polymers

These water-soluble polymers are well-known. When the compositions of this invention are used in water-treating applications, the acrylamide polymers should have a molecular weight (weight average) within the range of 500–100,000. The acrylamide polymer may be a homopolymer of acrylamide or a copolymer of acrylamide which must contain at least 5 mole percent of acrylamide. The balance of the copolymer should be composed of acrylamide or from 0.5–95 mole percent of a carboxylate monomer such as would be derived from fumaric, itaconic, acrylic, maleic, aconitic or methacrylic acids and the like. In many instances, the acrylamide polymers may be substituted by its equivalent methacrylamide polymers. When the acrylamide polymer is modified as discussed hereafter and is to be used in non-water treating applications, the molecular weight may be high, e.g. 500,000–25,000,000.

Reacting the Water-Insoluble Aliphatic Primary or Secondary Amines with the Acrylamide Polymer The reaction is conducted at a temperature of at least 125° C., and preferably between 150°–200° C. The reaction is conducted using the polymer in the form of an aqueous solution and in a pressurized container so that autogenous pressures are generated. The reaction time may vary between one up to several hours, with the reaction time being a function of reaction temperature of the particular reactants used.

Using the above conditions, the water-insoluble amine is caused to transamidate with the amide group in the acrylamide polymer thus forming a substituted acrylamide polymer which is water soluble/water dispersible.

The amount of water-insoluble amine used to transamidate the polymer should be such that not more than 50 mole percent of the total polymer contains amide groups derived from the water-soluble starting amide. Greater amounts of the water-soluble amine such as morpholine, monoethanolamine, cyclohexylamine can be incorporated to the starting acrylamide polymer, such polymer when hydrolyzed under conditions such as those found in a boiler or in many industrial applications produce neutralizing amine which acts as acid corrosion inhibitor.

The polymer as described above finds application in many of the industrial processes of the type previously mentioned. They are particularly suited to treating boilers where the amines of the type described above are used as condensate corrosion inhibitors. When so used, the compositions are preferably added to the boiler waters, although they may be added to steam lines or the condensate return lines. The boiler water is, however, the preferred point of addition.

In preventing condensate corrosion, the water-insoluble, film-forming aliphatic amines described above are added to the boiler water or to the condensate at a dosage of between 0.1–50 ppm by weight. A typical dosage is 0.1 to 3.0 ppm with dosage as high as 10–25 ppm being used.

Typical of the amines used to treat condensate corrosion problems in boilers is octadecyl amine. Also capable of use are the fatty aliphatic diamines disclosed in U.S. Pat. No. 3,029,125.

When these amines are transamidated and formed into the structure of the starting acrylamide polymer, they are used as described in U.S. Pat. No. 4,457,847. This patent discloses a method of treating hardness present in boiler waters which are in contact with heat transfer surfaces to prevent and remove scale caused by such hardness which comprises treating such waters with a water-soluble anionic vinyl polymer containing at least 30% by weight of carboxylate functionality with said polymer having a molecular weight within the range of 500–50,000 and with the amount of such polymer being within the range of 1–30 ppm per ppm hardness present in such waters.

In a preferred embodiment, the boiler waters are simultaneously treated with the water-soluble anionic vinyl polymers containing carboxylate functionality and another water-soluble anionic vinyl polymer which has dispersing properties. The disclosure of this patent is incorporated by reference.

It is obvious that the dosage of water-insoluble amine is different than the dosage of acrylamide polymer used to prevent scale or corrosion as described in U.S. Pat. No. 4,457,847, or in any of the references cited in this patent.

Therefore, the amount of fatty amine reacted with the starting acrylamide polymer will be adjusted such that when the polymer is placed in the boiler water the amount of amine released by hydrolysis will be that amount sufficient to control condensate corrosion whereas the polymer will be sufficient to prevent, remove, or inhibit scale and to provide other protection to the metal surfaces in contact with the boiler water.

Similarly, the amount of polymer modified by the insoluble amine will be varied when they are used to treat refinery condensate in distilling petroleum products as described in U.S. Pat. No. 3,447,891.

SYNTHESIS OF N-SUBSTITUTED ACRYLAMIDE POLYMERS

EXAMPLE 1

A mixture of polyacrylamide (100 g, 29% in water, Mw 16,000) and tallow amine (Armeen T, 54 g) was heated to 150° C. and maintained at that temperature for four hours in a 300 ml Paar reactor which was equipped with a mechanical stirrer and a thermocouple. The product was cooled and recovered as a homogeneous paste.

EXAMPLE 2

A mixture of poly(acrylic acid[70% mole]-acrylamide), (150 g, 29.7% in water, Mw 38,400) and tallow amine (Armeen T, 6.7 g) was heated at 175° C. and maintained at that temperature for four hours in a 300 ml Parr reactor. The product was cooled and recovered as a homogeneous solution.

EXAMPLE 3

A mixture of poly(acrylic acid[70% mole]-acrylamide), (300 g, 29.7% in water, Mw 38,400) and octadecylamine (Armeen 18D, 13.4 g) was heated at 175° C. and maintained at that temperature for four hours in a 600 ml Parr reactor. The product was cooled and recovered as a homogeneous solution.

EXAMPLE 4

A mixture of poly(acrylic acid[25% mole]-acrylamide) (120 g, 27.5% in water) and soya-amine (Armeen S, 25.8 g) was heated to 150° C. and maintained at that temperature for seven hours in a 300 ml Parr reactor. The product was cooled and recovered as a homogeneous paste and it was found to be water soluble/water dispersible.

RESULTS

Evidence of Hydrolysis

Evaluation of octadecylamine (ODA) hydrolysis as a function of temperature is reported in the drawing. The experimental data shows that at temperatures 500° F. hydrolysis occurs readily. In boilers residence times are generally greater than 2 hours.

Evidence of Release of Filming Amines in Boilers

Test No. 2 (Table I) shows that 1.26 ppm of tallow amine is recovered in the condensate system, when the reaction product was fed to the feedwater. The theoretical amount expected was 1.36 ppm.

Test No. 3 (Table I) shows that 0.93 ppm of octadecylamine is recovered in the condensate system, when the reaction product was fed to the feedwater. The theoretical amount expected was 1.36 ppm.

The test methods used in the above experiments are described in U.S. Pat. No. 4,457,847.

Benefits of the Polymers for Hardness and Iron Control

See Tables I and II.

Based on the above, it is evident that new polymeric compositions have been discovered.

TABLE I

Scale Boiler Results
2 days-1,000 psig-1.0 ppm Ca, 0.5 ppm Mg,
0.5 ppm $SiO_2$-10 cycles-110,000 Btu/ft$^2$ hr.

| Test No. | Treatment | Feedwater Dosage (ppm polymer) | % Transport | | | | $NH_3$ Prod (ppm) | Amine (ppm) |
|---|---|---|---|---|---|---|---|---|
| | | | Ca | Mg | $SiO_2$ | Prod | | |
| 1 | Blank | None | 48 | 3 | 55 | — | — | — |
| 2 | Example 2 | 9 | 87 | 85 | 94 | 80 | 0.44 | 1.26 |
| 3 | Example 3 | 9 | 88 | 92 | 103 | 87 | 0.58 | 0.93 |

TABLE II*

| Treatment | % Fe Transport |
|---|---|
| Blank | 28 |
| Example 2 | 70 |
| Example 3 | 78 |

*Iron transport was calculated based on feeding iron through a once-through pressurized reactor at 400° F. and measuring the amount of iron coming out.

Having described our invention, we claim:

1. A method for preventing condensate corrosion in boilers which comprises treating the condensate with a water-soluble or dispersible polymeric composition comprising an acrylic acid polymer having a molecular weight within the range of 500–100,000 which contains between 0.5–50 mole percent of the acrylic acid groups in the form of the amides of a water-insoluble aliphatic primary or secondary amine which contains from 10–36 carbon atoms;

said composition hydrolyzing under the conditions found in the condensate to release a corrosion inhibiting amount of said amine.

2. The method of claim 1 wherein the amine is octadecylamine.

3. A method for preventing condensate corrosion in boilers which comprises treating boiler water with a composition comprising an acrylic acid polymer having a molecular weight within the range of 500–100,000 which contains between 0.5–50 mole percent of the acrylic acid groups in the form of the amides of a water-insoluble aliphatic primary or secondary amine which contains from 10–36 carbon atoms;

said composition hydrolyzing under the conditions found in the condensate to release a corrosion inhibiting amount of said amine.

4. The method of claim 3 wherein the amine is octadecylamine.

* * * * *